(12) United States Patent
Cragun

(10) Patent No.: US 8,344,861 B2
(45) Date of Patent: Jan. 1, 2013

(54) HAPTIC MOTION FEEDBACK MECHANISM

(75) Inventor: Brian J Cragun, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1017 days.

(21) Appl. No.: 12/353,658

(22) Filed: Jan. 14, 2009

(65) Prior Publication Data

US 2010/0177065 A1    Jul. 15, 2010

(51) Int. Cl.
| | |
|---|---|
| *H04B 3/36* | (2006.01) |
| *G08B 6/00* | (2006.01) |
| *G09G 5/00* | (2006.01) |
| *G06F 3/033* | (2006.01) |
| *A63F 9/24* | (2006.01) |
| *G09B 21/00* | (2006.01) |
| *G09B 21/02* | (2006.01) |

(52) U.S. Cl. .......... 340/407.1; 340/407.2; 345/156; 345/161; 345/179; 345/184; 463/30; 434/112; 434/113; 434/114; 434/115; 434/117

(58) Field of Classification Search .......... 340/407.1, 340/407.2; 345/184, 179, 161, 156; 463/130, 463/30; 434/112–115, 117
See application file for complete search history.

(56) References Cited

U.S. PATENT DOCUMENTS

| | | | |
|---|---|---|---|
| 7,264,554 B2 | 9/2007 | Bentley | |
| 7,427,201 B2 | 9/2008 | Meisner | |
| 7,433,885 B2 | 10/2008 | Jones | |
| 7,848,543 B2 | 12/2010 | Raghavan et al. | |
| 2002/0050923 A1* | 5/2002 | Petersen | 340/407.1 |
| 2005/0131924 A1 | 6/2005 | Jones | |
| 2005/0186544 A1 | 8/2005 | Raghavan et al. | |
| 2007/0052674 A1* | 3/2007 | Culver | 345/157 |
| 2007/0091063 A1* | 4/2007 | Nakamura et al. | 345/156 |
| 2007/0161263 A1 | 7/2007 | Meisner | |
| 2007/0270214 A1 | 11/2007 | Bentley | |
| 2007/0298877 A1* | 12/2007 | Rosenberg | 463/30 |
| 2008/0226134 A1* | 9/2008 | Stetten et al. | 382/114 |
| 2009/0036212 A1* | 2/2009 | Provancher | 463/37 |
| 2009/0063552 A1 | 3/2009 | Jones | |
| 2009/0076476 A1 | 3/2009 | Barbagli et al. | |
| 2009/0085751 A1 | 4/2009 | Sakama et al. | |
| 2009/0282369 A1 | 11/2009 | Jones | |
| 2009/0285407 A1 | 11/2009 | Cragun | |
| 2009/0322499 A1* | 12/2009 | Pryor | 340/407.2 |
| 2010/0177064 A1 | 7/2010 | Cragun | |

* cited by examiner

*Primary Examiner* — Benjamin C Lee
*Assistant Examiner* — Christopher Gaines
(74) *Attorney, Agent, or Firm* — Patterson & Sheridan LLP

(57) ABSTRACT

In one embodiment, the invention is a haptic motion feedback mechanism. One embodiment of an apparatus for communicating motion in a virtual space includes a base and a feedback mechanism coupled to the base, the feedback mechanism using forced air to convey motion in the virtual space. In another embodiment, a method for communicating motion in a virtual space using a feedback mechanism includes receiving a signal indicative of user motion from a computing device on which the virtual space is running and forcing air through the feedback mechanism in order to convey the user motion.

17 Claims, 4 Drawing Sheets

HAPTIC MOTION FEEDBACK MECHANISM

BACKGROUND OF THE INVENTION

The present invention relates generally to virtual three-dimensional worlds, and relates more specifically to mechanisms for assisting the visually impaired in navigating virtual three-dimensional worlds.

Virtual three-dimensional worlds (i.e., computer-based simulated environments) are becoming a standard part of the modern World Wide Web. Such worlds are largely visual in content delivery, however, and offer very little feedback in the form of alternate modalities (e.g., audio, haptic). This makes virtual three-dimensional worlds extremely difficult for visually impaired users to navigate.

Thus, there is a need in the art for a haptic motion feedback mechanism that allows visually impaired users to navigate virtual three-dimensional worlds.

SUMMARY OF THE INVENTION

In one embodiment, the invention is a haptic motion feedback mechanism. One embodiment of an apparatus for communicating motion in a virtual space includes a base and a feedback mechanism coupled to the base, the feedback mechanism using forced air to convey motion in the virtual space.

In another embodiment, a method for communicating motion in a virtual space using a feedback mechanism includes receiving a signal indicative of user motion from a computing device on which the virtual space is running and forcing air through the feedback mechanism in order to convey an element of the user motion.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention is a haptic motion feedback mechanism that allows visually impaired users to navigate virtual three-dimensional worlds. Embodiments of the haptic motion feedback mechanism are designed to provide a user with tactile feedback indicative of motion (i.e., direction and/or speed) in a three-dimensional virtual world. By using the haptic motion feedback mechanism, a visually impaired user can "see" where he or she is going in the three-dimensional virtual world.

Figure 1:
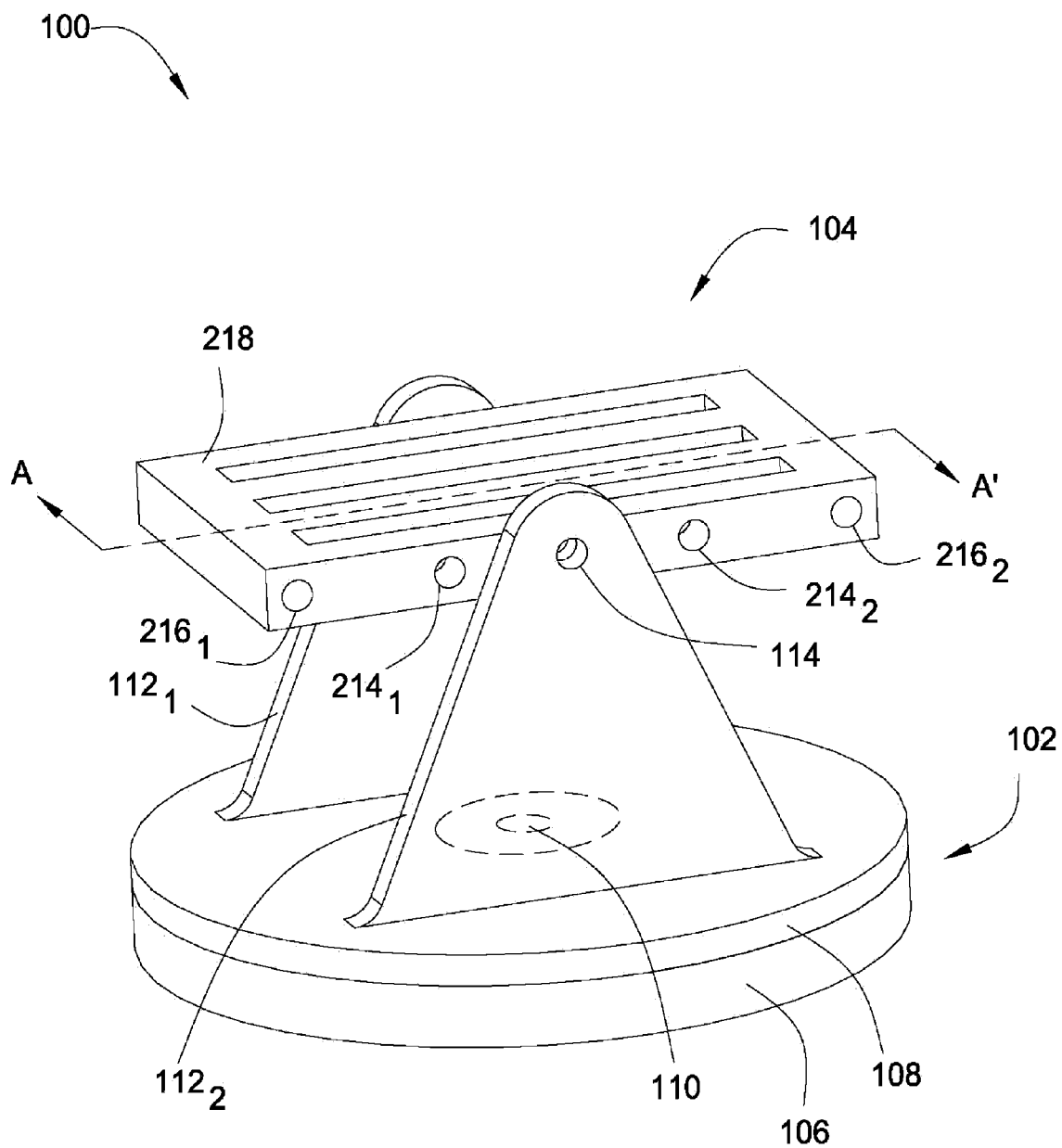
FIG. 1 illustrates one embodiment of a haptic motion feedback mechanism, according to the present invention.

FIG. 1 illustrates one embodiment of a haptic motion feedback mechanism 100, according to the present invention. As illustrated, the mechanism 100 comprises a base 102 and a belt assembly 104 mounted to the base 102.

In one embodiment, the base 102 comprises a first disk 106 and a second disk 108. The second disk 108 is rotatably mounted to the first disk 106, such that the second disk 108 can rotate within a 360 degree range about a central axis 110 (illustrated in phantom) while the first disk 106 remains substantially stationary. In one embodiment, a servo-mechanism in either the first disk 106 or the second disk 108 controls rotation of the second disk 108. In an alternative embodiment, the base 102 is fixed (i.e., not rotatable).

In one embodiment, the second disk 108 further comprises at least one armature $112_1$-$112_2$ (hereinafter collectively referred to as "armatures 112") extending therefrom. The embodiment illustrated in FIG. 1 comprises two armatures 112. The armatures 112 extend from the second disk 118 in a substantially parallel, spaced-apart manner relative to each other. In one embodiment, each of the armatures 112 additionally comprises a pivot point 114 centered on a distal end thereof, through which an axle (not shown) is disposed. The pivot point 114 is adapted for coupling the belt assembly 104 to the base 102, where the belt assembly 104 is mounted on the axle. In this way, the belt assembly 104 is capable of pivoting or tilting on the axle disposed through the pivot point 114. In one embodiment, a servo mechanism disposed on the axle between the armatures 112 and the belt assembly 104 controls the pivot or tilt of the belt assembly 104. In an alternative embodiment, the belt assembly 104 is fixed (i.e., not capable of pivoting or tilting). In this embodiment, the belt assembly 104 may be coupled directly to the base 102 (i.e., the armatures 112 are not used).

Figure 2:
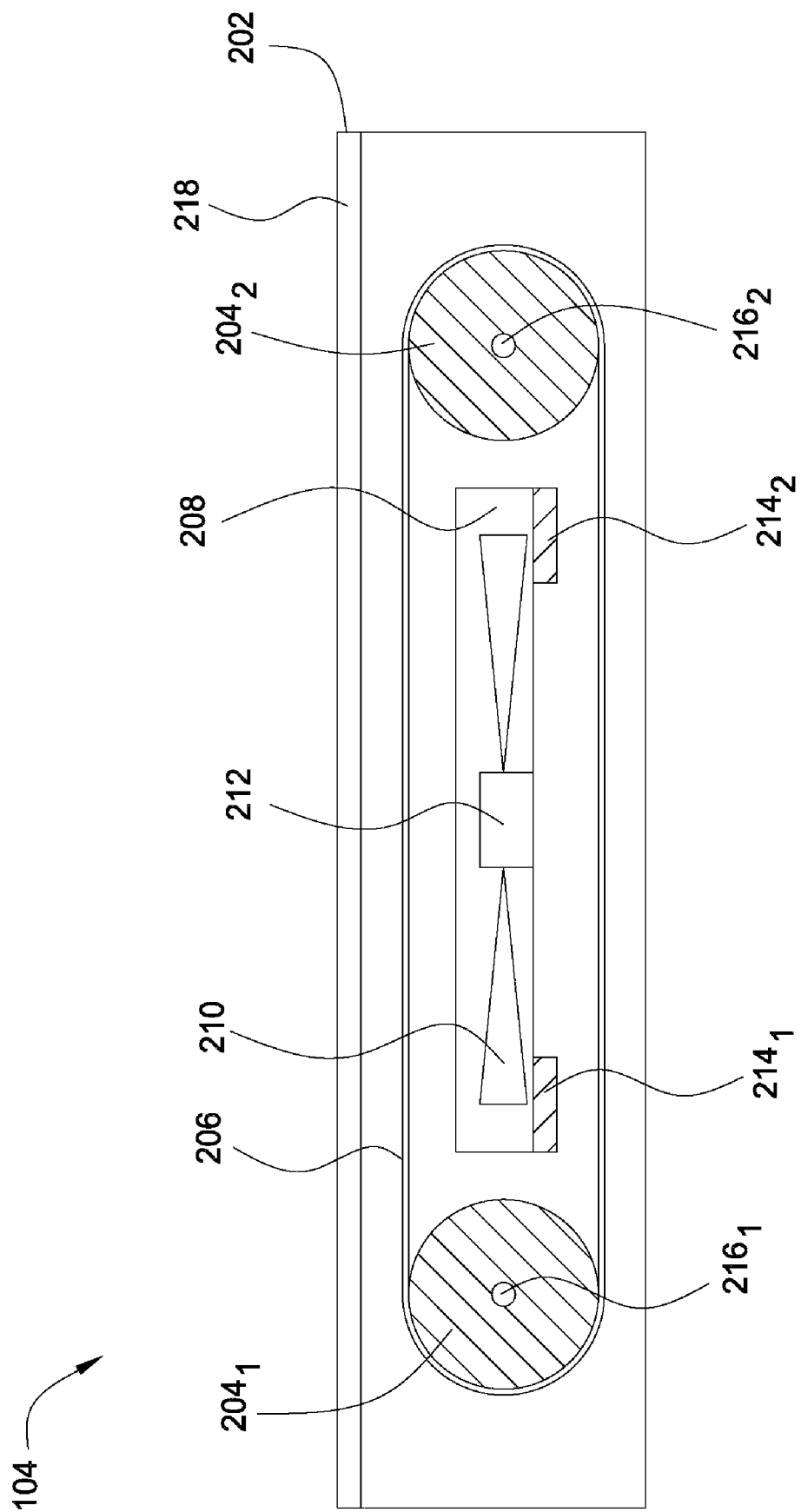
FIG. 2 illustrates a cross sectional view of one embodiment of the belt assembly illustrated in FIG. 1, taken along line A-A'.

FIG. 2 illustrates a cross sectional view of one embodiment of the belt assembly 104 illustrated in FIG. 1, taken along line A-A'. As illustrated, the belt assembly 104 comprises a housing 202, within which is housed at least one roller $204_1$-$204_2$ (hereinafter collectively referred to as "rollers 204"), a belt 206, and an air chamber 208.

Figure 3:
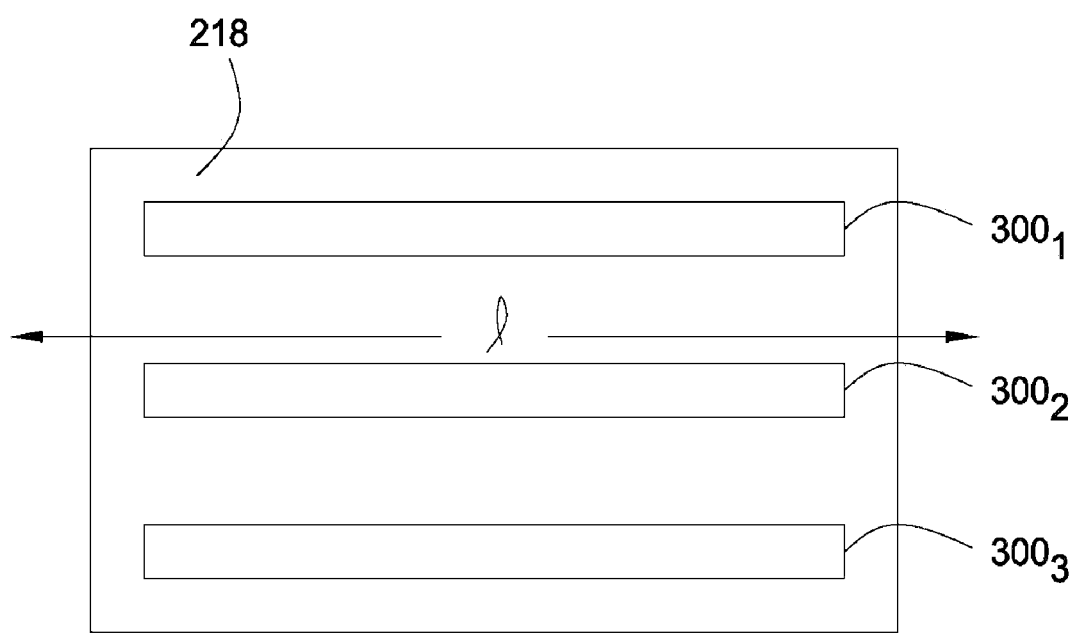
FIG. 3 illustrates a top view of one embodiment of the grating, according to the present invention.

The housing 202 is shaped substantially as a rectangular box. An outward facing side of the housing 202 (i.e., facing outward from the base 102 of the mechanism 100) comprises a grating 218. FIG. 3 illustrates a top view of one embodiment of the grating 218, according to the present invention. As illustrated, the grating 218 comprises a plurality of slots $300_1$-$300_3$ (hereinafter collectively referred to as "slots 300"). Although FIG. 3 illustrates the grating 218 as having only three slots 300, those skilled in the art will appreciate that the grating 218 may have any number of slots 300. In one embodiment, the slots 300 are disposed lengthwise along a surface of the grating 218 (i.e., substantially parallel with a longitudinal axis, 1, of the grating 218). In one embodiment, the slots 300 are positioned in substantially parallel, spaced-apart relation relative to each other. In an alternate embodiment, the grating 218 is a screen or mesh. In one embodiment, the grating 218 is formed of a substantially rigid material (i.e., rigid enough to not deform substantially under pressure from a human hand) such as metal or plastic.

Referring back to FIG. 2, the rollers 204 are configured to rotate about axles $216_1$-$216_2$ (hereinafter collectively referred to as "axles 216") positioned at opposite longitudinal ends of the housing 202. The belt 206 is stretched over the rollers 204 in a continuous loop such that rotation of the rollers 204 will roll the surface of the belt 206 in a given direction. In one embodiment, rotation of the rollers 204 is controlled by a motor. Although FIG. 2 illustrates the use of a pair of rollers 204, those skilled in the art will appreciate that any number of rollers may be used to roll the belt 206.

Figure 4:
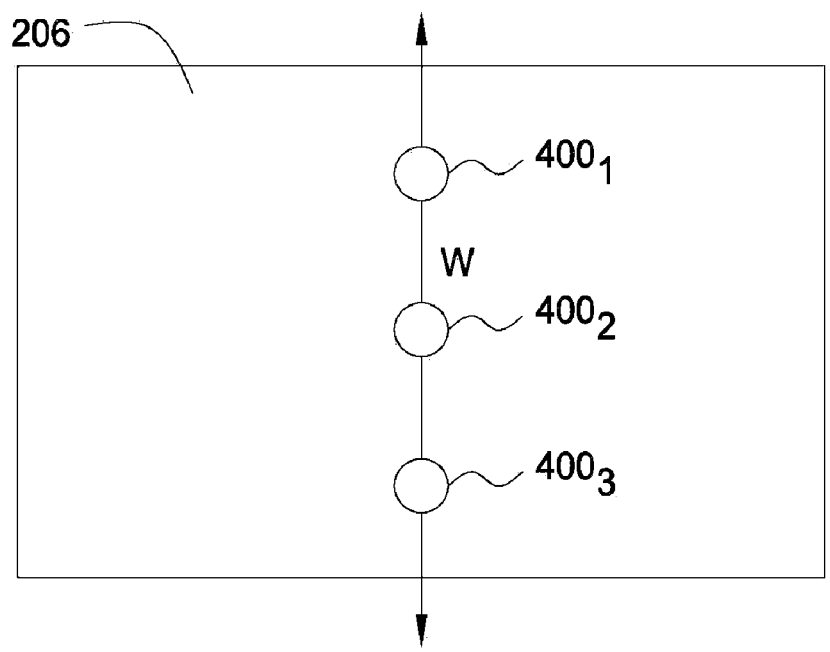
FIG. 4 is a top view illustrating one embodiment of the belt, according to the present invention.

FIG. 4 is a top view illustrating one embodiment of the belt 206, according to the present invention. As illustrated, the belt 206 comprises a length of material having a plurality of apertures $400_1$-$400_2$ (hereinafter collectively referred to as "apertures 400") formed in its surface. The apertures 400 may be formed of any shape. For instance, although FIG. 4 illustrates the apertures 400 as a set of round holes, the apertures 400 could alternatively be formed as one or more slots configured for perpendicular orientation relative to the slots 300 in the grating 218. Moreover, although FIG. 4 illustrates the belt 206 as having only three apertures 400, those skilled in the art will appreciate that the belt 206 may have any number of apertures 400. In one embodiment, the apertures 400 are substantially collinear along a line, w, that extends across a width of the belt 206. The belt 206 may include any number of such lines along which one or more apertures are formed.

Referring back to FIG. 2, the air chamber 208 is positioned between the rollers 204, within a volume bounded by the belt 206. The air chamber 208 comprises a fan 210, a motor 212, and at least one inlet $214_1$-$214_2$ (hereinafter collectively referred to as "inlets 214"). The motor 212 is configured to rotate the fan 210, while the inlets 214 are configured to draw in air from the exterior of the housing 202, as illustrated in FIG. 1. In one embodiment, a power supply run through one or both of the armatures 112 of the base 102 powers the motor 212. In one embodiment, a screen (not shown) is positioned below and/or above the fan 210.

In operation, the fan 210 blows air toward the grating 218. As the belt 206 rolls over the rollers 204, the apertures 400 formed in the belt 206 will substantially line up with the slots 300 in the grating 218. As this happens, air is forced by the fan 210 through the apertures 400 and escapes through the slots 300. Thus, as the belt 206 rolls, the forced air that escapes through the slots 300 can be felt traveling along at least a portion of the lengths of the slots 300.

By forcing the air through the slots 300 in this manner, motion and position in a virtual three-dimensional world can be communicated to a user who places his or her hand on or above the grating 218. For instance, forced air traveling or rolling along the lengths of the slots 300 can communicate motion in the virtual three-dimensional world. Rotation of the base 102 can communicate horizontal motion (forward, backward, or sideways) in the virtual three-dimensional world. In addition, tilting of the belt assembly 104 about the pivot points 114 can communicate a motion in a sloped terrain or, if orientated vertically, upward or downward motion. The speed of the belt and the travel of the forced air in the lengths of the slots 300 can also communicate the speed with which the user is moving in the three-dimensional virtual world. All of these movements can be communicated to a stationary hand resting on or above the grating 218.

In one embodiment, the mechanism 100 can also be used as an input device that controls motion in the virtual three dimensional world (e.g., similar to a joystick). For instance, with the grating 218 in place, a user could communicate left, right, and tilting motions (e.g., by rotating about the base 102 or tilting the belt assembly 104). Without the grating 218 in place, the user might be able to communicate further motion by moving the belt 206.

Figure 5:
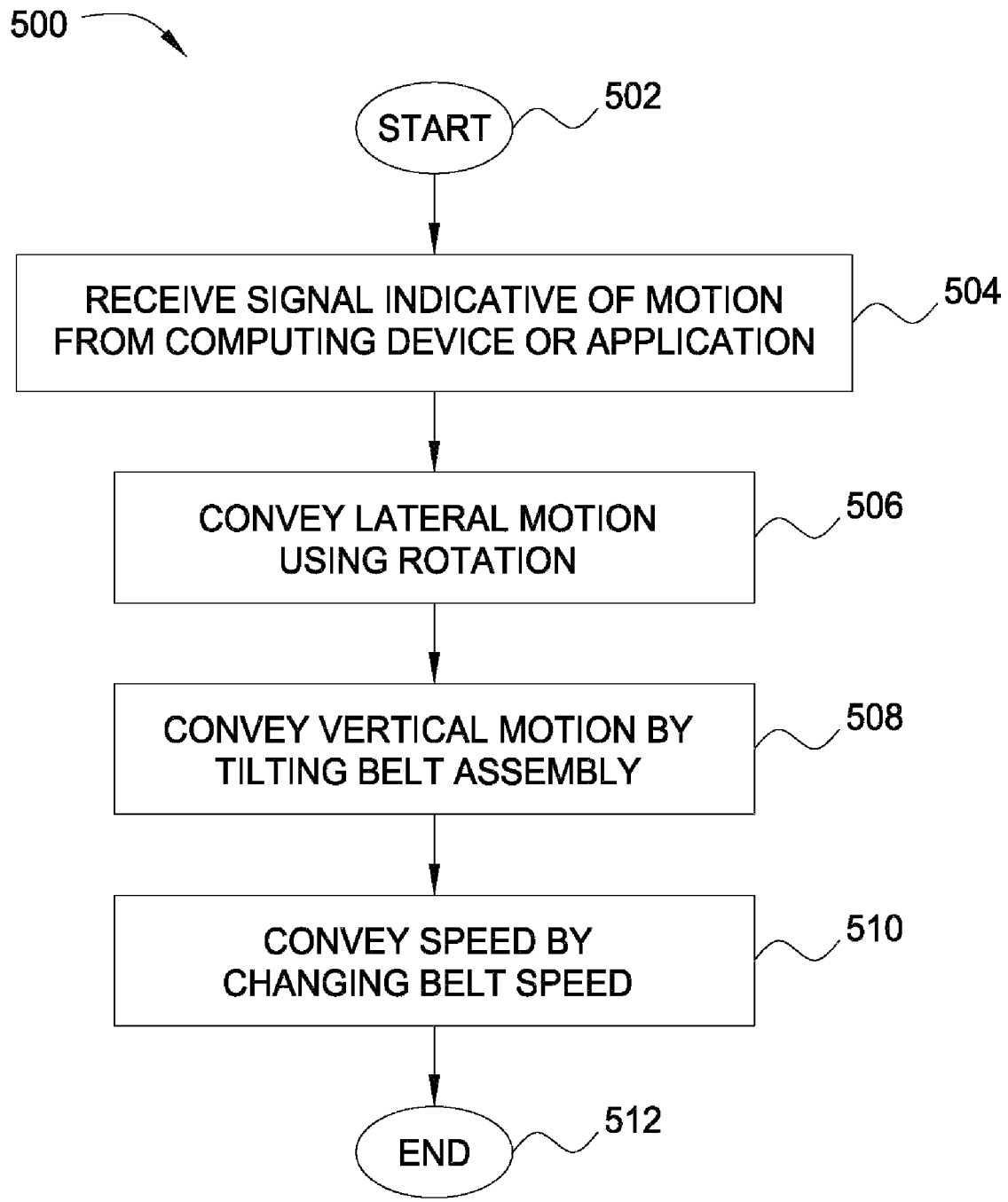
FIG. 5 is a flow diagram illustrating one embodiment of a method for providing tactile feedback indicative of motion in a virtual three-dimensional world to a user, according to the present invention.

FIG. 5 is a flow diagram illustrating one embodiment of a method 500 for providing tactile feedback indicative of motion in a virtual three-dimensional world to a user, according to one embodiment of the present invention.

The method 500 is initialized at step 502 and proceeds to step 504, where the method 500 receives a signal from a computing device on which the application for the virtual three-dimensional world is running. The signal indicates motion of the user in the virtual three-dimensional world.

In step 506, the method 500 conveys the horizontal (forward, backward, or sideways) element of the motion using rotation (e.g., as described above with respect to the rotatable base). In step 508, the method 500 conveys the vertical (upward or downward) element of the motion to the user by tilting the belt assembly (e.g., as described above with respect to the belt assembly). In step 510, the method 500 conveys the speed of the motion by changing the speed of the belt in the belt assembly (e.g., as described above with respect to the belt). In one embodiment, the vertical element of the motion, the horizontal element of the motion, and the speed are conveyed simultaneously. The method 500 then terminates in step 512.

In this manner, the present invention provides a user with tactile feedback indicative of motion (i.e., direction and/or speed) in a three-dimensional virtual world. By using the haptic motion feedback mechanism, a visually impaired user can "see" the direction and speed he or she is going in the three-dimensional virtual world. Moreover, because the motion is communicated through forced air, the haptic feedback is provided via a mechanism that is relatively comfortable (e.g., non-abrasive) to use and may be felt safely and comfortably by the hand or another body part.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. Apparatus for communicating tactile feedback indicative of motion in a virtual space, the apparatus comprising:
  a base; and
  a belt assembly coupled to the base comprising:
    a housing defining an outward facing opening;
    a belt adapted to roll within the housing by at least one roller, the belt comprising a length of material configured to be looped around at the least one roller and a plurality of apertures formed in the length of material; and
    an air chamber disposed in a volume bounded by the belt and comprising a fan for generating forced air, the opening configured to allow the forced air to flow outward through the apertures and the opening, thereby conveying motion in the virtual space by controlling at least the movement of the belt, thereby controlling delivery of the forced air.

2. The apparatus of claim 1, wherein the base is rotatable about a central axis.

3. The apparatus of claim 2, further comprising:
a servo-mechanism disposed in the base for controlling rotation of the base about the central axis.

4. The apparatus of claim 1, wherein the base comprises at least one armature for coupling to the belt assembly.

5. The apparatus of claim 4, wherein the at least one armature comprises two armatures disposed in a substantially parallel, spaced-apart relation relative to each other.

6. The apparatus of claim 5, wherein each of the two armatures comprises a pivot point at a distal end.

7. The apparatus of claim 6, wherein the belt assembly is mounted on an axle disposed through each pivot point, such that the belt assembly is tiltable on the axle.

8. The apparatus of claim 7, further comprising:
a servo mechanism disposed on the axle between the two armatures and the belt assembly for controlling tilt of the belt assembly on the axle.

9. The apparatus of claim 1, wherein the housing further comprises:
a grating positioned on a side of the housing facing outward from the base, the grating comprising a plurality of slots configured for allowing air generated by the air chamber to escape the housing.

10. The apparatus of claim 9, wherein the grating is formed of a substantially rigid material.

11. The apparatus of claim 9, wherein the plurality of slots is positioned substantially parallel with a longitudinal axis of the grating.

12. The apparatus of claim 9, wherein the slots is positioned in a substantially parallel, spaced-apart relation relative to each other.

13. The apparatus of claim 1, further comprising:
a motor for controlling rotation of the at least one roller.

14. The apparatus of claim 1, wherein the plurality of apertures is substantially collinear along a line that extends across a width of the belt.

15. The apparatus of claim 1, wherein the plurality of apertures is positioned to substantially line up with the plurality of slots in the grating when the belt rolls.

16. The apparatus of claim 1, wherein the air chamber further comprises:
a motor configured for rotating the fan; and
at least one inlet configured to draw air from an exterior of the housing.

17. A method for communicating tactile feedback indicative of motion in a virtual space using a feedback mechanism, the method comprising:
receiving a signal indicative of user motion from a computing device on which the virtual space is running;
upon determining the signal is indicative of horizontal user motion, rotating a base of the feedback mechanism to convey horizontal user motion;
upon determining the signal is indicative of vertical user motion, tilting a belt assembly of the feedback mechanism to convey vertical motion, wherein the belt assembly comprises a belt with a plurality of apertures; and
forcing air generated by a fan within the belt assembly through the apertures of the belt in order to convey the speed of the user motion.

* * * * *